United States Patent
Yasuda

(10) Patent No.: US 12,466,017 B2
(45) Date of Patent: Nov. 11, 2025

(54) CONTROL DEVICE AND COMPUTING DEVICE

(71) Applicant: FANUC CORPORATION, Yamanashi (JP)

(72) Inventor: Masashi Yasuda, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 195 days.

(21) Appl. No.: 18/261,064

(22) PCT Filed: Jan. 17, 2022

(86) PCT No.: PCT/JP2022/001357
§ 371 (c)(1),
(2) Date: Jul. 11, 2023

(87) PCT Pub. No.: WO2022/158415
PCT Pub. Date: Jul. 28, 2022

(65) Prior Publication Data
US 2024/0316713 A1 Sep. 26, 2024

(30) Foreign Application Priority Data
Jan. 21, 2021 (JP) .................................. 2021-007937

(51) Int. Cl.
*G05B 19/4093* (2006.01)
*B23Q 15/013* (2006.01)

(52) U.S. Cl.
CPC ....... *B23Q 15/013* (2013.01); *G05B 19/4093* (2013.01); *G05B 2219/49313* (2013.01)

(58) Field of Classification Search
CPC .............. B23Q 15/013; G05B 19/4093; G05B 2219/49313
See application file for complete search history.

(56) References Cited

U.S. PATENT DOCUMENTS

2016/0266567 A1* 9/2016 Watanabe .............. G05B 19/19
2018/0281090 A1* 10/2018 Watanabe .......... G05B 19/4093

FOREIGN PATENT DOCUMENTS

| CN | 102129231 A | 7/2011 |
| JP | H05-305501 A | 11/1993 |

(Continued)

OTHER PUBLICATIONS

International Search Report issued in PCT/JP2022/001357; mailed Mar. 29, 2022.

*Primary Examiner* — Cortez M Cook
(74) *Attorney, Agent, or Firm* — Studebaker Brackett PLLC

(57) ABSTRACT

Provided are a control device and a computing device capable of adjusting synthetic vibration for a machine tool. This control device, which controls a machine tool, comprises: a vibration command generation unit that generates a vibration command for vibrating an implement of the machine tool or a workpiece; a relative vibration command generation unit that generates a relative vibration command for vibrating the implement and the workpiece relatively; and a vibration phase adjustment unit that adjusts the vibration phase of at least one of the vibration command and the relative vibration command on the basis of the vibration command and the relative vibration command.

8 Claims, 14 Drawing Sheets

(56) References Cited

FOREIGN PATENT DOCUMENTS

| | | |
|---|---|---|
| JP | 2021-003802 A | 1/2021 |
| JP | 6843314 B1 | 3/2021 |
| WO | 2013/061445 A1 | 5/2013 |
| WO | 2021/048959 A1 | 3/2021 |

* cited by examiner

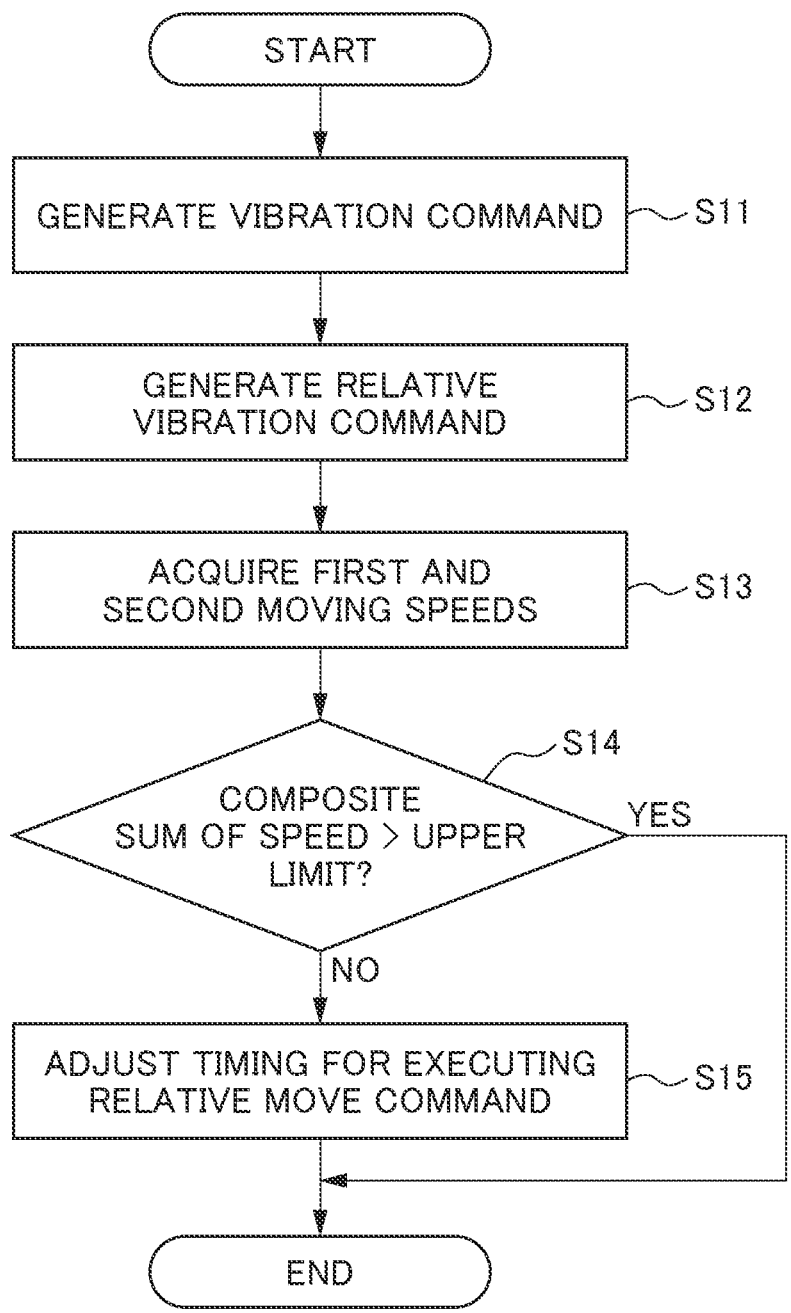

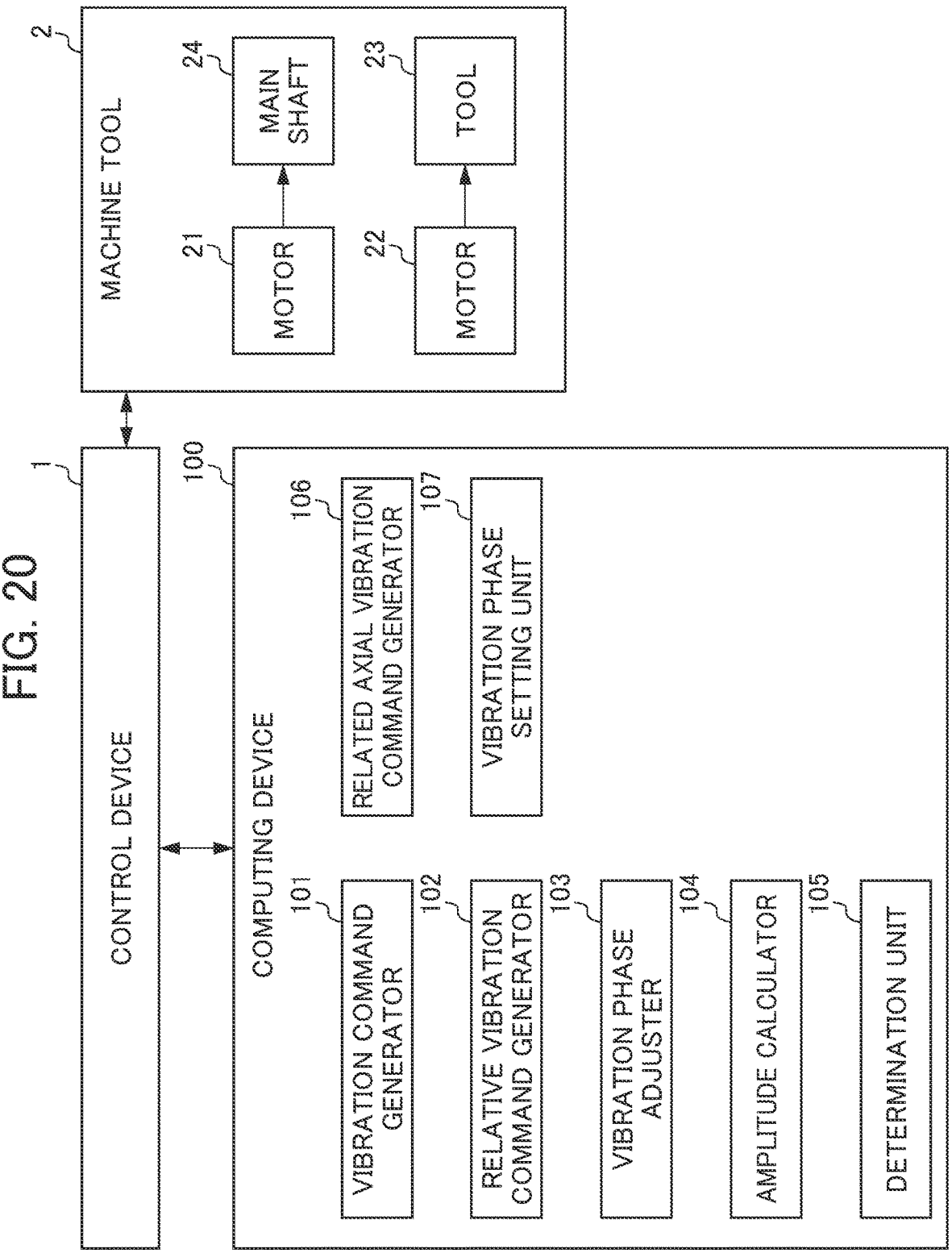

CONTROL DEVICE AND COMPUTING DEVICE

TECHNICAL FIELD

The present invention relates to a control device and a computing device.

BACKGROUND ART

An eccentric machining technique of machining an eccentric workpiece using a machine tool has been known (see, e.g., Patent Document 1). For the eccentric machining, the machine tool needs to vibrate a tool to set the tool in the position of the workpiece to be eccentrically machined.
Patent Document 1: Japanese Unexamined Patent Application, Publication No. H05-305501

DISCLOSURE OF THE INVENTION

Problems to be Solved by the Invention

Another machining technique of vibrating the tool relative to the workpiece, such as oscillation cutting, has been known. When the tool is vibrated relative to the workpiece during the eccentric machining, composite vibration, which is a composition of the vibration of the tool caused by the eccentric machining and the vibration of the tool relative to the workpiece (e.g., an amplitude and acceleration of the composite vibration and mechanical vibration and sound), may deviate from an allowable range. The vibration needs to be minimized as much as possible in some cases in view of a load on the machine tool. Thus, the composite vibration of the machine tool requires adjustment.

Means for Solving the Problems

In an aspect of the present disclosure, a control device for controlling a machine tool includes: a vibration command generator that generates a vibration command to cause a tool of the machine tool or a workpiece to vibrate; a relative vibration command generator that generates a relative vibration command to cause the tool and the workpiece to relatively vibrate; and a vibration phase adjuster that adjusts at least one of a phase of vibration caused by the vibration command or a phase of vibration caused by the relative vibration command based on the vibration command and the relative vibration command.

In an aspect of the present disclosure, a control device for controlling a machine tool includes: a vibration command generator that generates a vibration command to cause a tool of the machine tool or a workpiece to vibrate; a relative move command generator that generates a relative move command to cause the tool and the workpiece to relatively move; and a command adjuster that adjusts at least one of a plurality of parameters of the vibration command and the relative move command.

In an aspect of the present disclosure, a computing device for a control device for controlling a machine tool includes: a vibration command generator that generates a vibration command to cause a tool of the machine tool or a workpiece to vibrate; a relative vibration command generator that generates a relative vibration command to cause the tool and the workpiece to relatively vibrate; and a vibration phase adjuster that adjusts at least one of a phase of vibration caused by the vibration command or a phase of vibration caused by the relative vibration command based on the vibration command and the relative vibration command.

In an aspect of the present disclosure, a computing device for a control device for controlling a machine tool includes: a vibration command generator that generates a vibration command to cause a tool of the machine tool or a workpiece to vibrate; a relative move command generator that generates a relative move command to cause the tool and the workpiece to relatively move; and a command adjuster that adjusts at least one of a plurality of parameters of the vibration command and the relative move command.

Effects of the Invention

According to the aspects of the present disclosure, composite vibration of a machine tool can be adjusted.

BRIEF DESCRIPTION OF THE DRAWINGS

FIG. 19 is a flowchart illustrating a flow of processes performed by the control device of the second embodiment; and FIG. 20 is a view schematically illustrating a computing device of another embodiment.

PREFERRED MODE FOR CARRYING OUT THE INVENTION

First Embodiment

Figure 1:
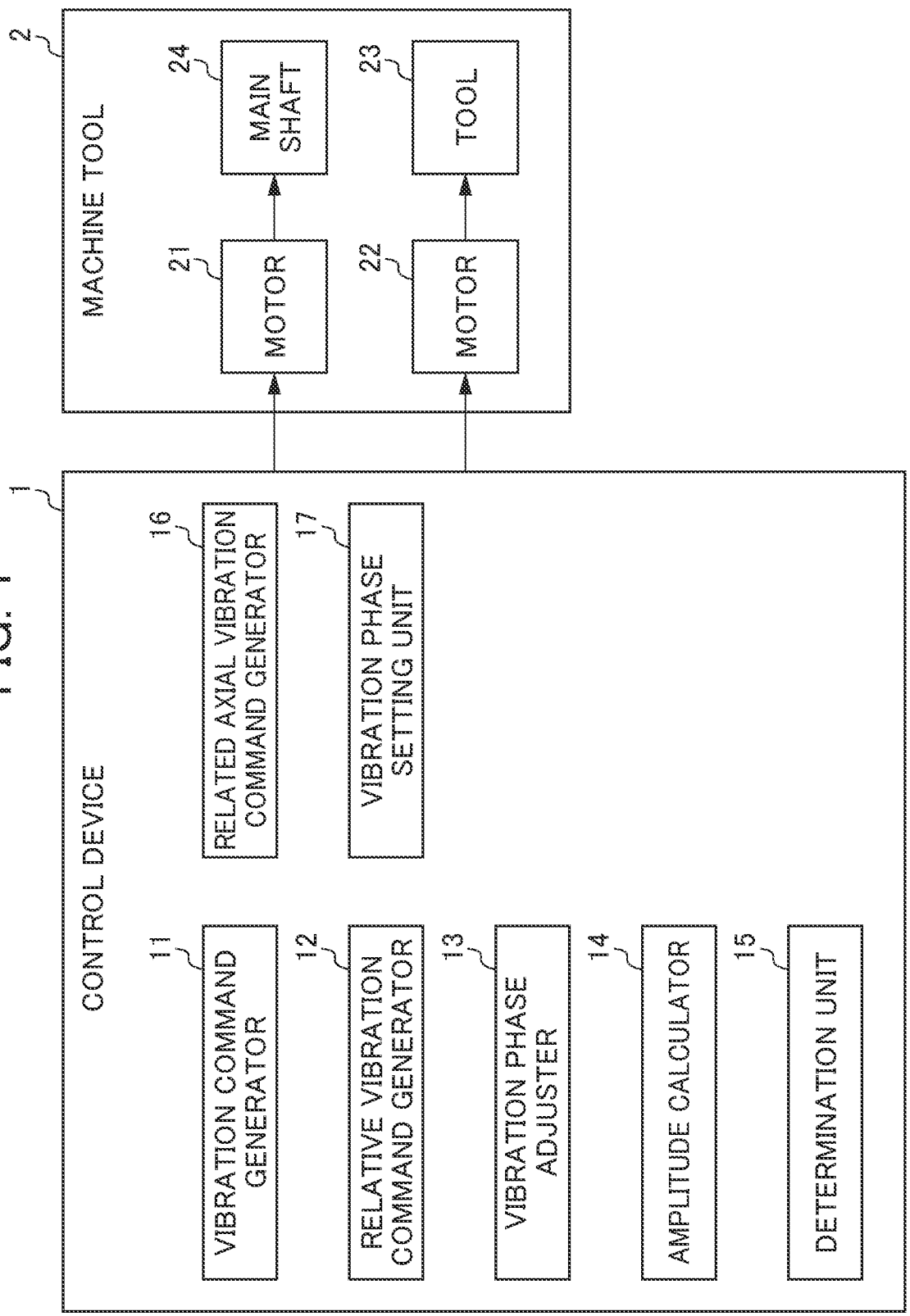
FIG. 1 is a view schematically illustrating a control device of a first embodiment.

Embodiments of the present invention will be described below. FIG. 1 is a view schematically illustrating a control device 1 of a first embodiment. The control device 1 is a device that controls a machine tool 2, and is, for example, a numerical control device.

The machine tool 2 performs machining of a workpiece by oscillation cutting in accordance with the control of the control device 1. The machine tool 2 includes motors 21 and 22. The motor 21 drives and controls a main shaft 24, for example, and the motor 22 drives and controls a tool 23.

The control device 1 includes a vibration command generator 11, a relative vibration command generator 12, a vibration phase adjuster 13, an amplitude calculator 14, a determination unit 15, a related axial vibration command generator 16, and a vibration phase setting unit 17.

Based on oscillation conditions for vibrating at least the tool 23 of the machine tool 2 or a workpiece 30, the vibration command generator 11 generates a vibration command to cause the tool 23 of the machine tool 2 or the workpiece 30 to vibrate. The vibration command generator 11 may generate the vibration command based on, for example, oscillation conditions including the magnification of an oscillation amplitude and the magnification of an oscillation frequency and machining conditions, or may generate the vibration command based on oscillation conditions including the oscillation amplitude and the oscillation frequency.

Based on oscillation conditions for relatively vibrating at least the tool 23 and the workpiece 30, the relative vibration command generator 12 generates a relative vibration command to cause the tool 23 and the workpiece 30 to relatively vibrate. The relative vibration command generator 12 may generate the relative vibration command based on, for example, oscillation conditions including the magnification of the oscillation amplitude and the magnification of the oscillation frequency and machining conditions for machining the workpiece 30, or may generate the relative vibration command based on oscillation conditions including the oscillation amplitude and the oscillation frequency.

The vibration phase adjuster 13 adjusts at least one of a phase of vibration caused by the vibration command or a phase of vibration caused by the relative vibration command based on the vibration command and the relative vibration command. Specifically, the vibration phase adjuster 13 adjusts at least one of the phase of the vibration caused by the vibration command or the phase of the vibration caused by the relative vibration command so that a parameter of composite vibration, which is a composition of the vibration caused by the vibration command and the vibration caused by the relative vibration command, has a predetermined value.

The amplitude calculator 14 calculates the amplitude of the vibration of the tool 23 or the workpiece 30 based on the vibration command and calculates the amplitude of the relative vibration of the tool 23 and the workpiece 30 based on the relative vibration command.

The determination unit 15 determines whether the parameter of the composite vibration is within a predetermined allowable range. When the parameter is out of the allowable range, the vibration phase adjuster 13 adjusts at least one of the phase of the vibration caused by the vibration command or the phase of the vibration caused by the relative vibration command.

The determination unit 15 determines whether the composite sum of amplitude, which is the parameter of the composite vibration and is the sum of the amplitude of the vibration of the tool 23 or the workpiece 30 and the amplitude of the relative vibration of the tool 23 and the workpiece 30, is equal to or less than an upper limit of the amplitude having the allowable range. The vibration phase adjuster 13 adjusts at least one of the phase of the vibration caused by the vibration command or the phase of the variation caused by the relative vibration command when the composite sum of amplitude exceeds the upper limit of the amplitude.

The determination unit 15 determines whether the composite sum of amplitude, which is the parameter and is the sum of the amplitude of the vibration of the tool 23 or the workpiece 30 and the amplitude of the relative vibration of the tool 23 and the workpiece 30, is equal to or less than the lower limit of the amplitude having the allowable range. The vibration phase adjuster 13 adjusts at least one of the phase of the vibration caused by the vibration command or the phase of the vibration caused by the relative vibration command when the composite sum of amplitude falls below the lower limit of the amplitude.

Based on the machining conditions for machining the workpiece 30, the related axial vibration command generator 16 generates a related axial vibration command that causes vibration with respect to a different axis direction related to the vibration of the tool 23 or the workpiece 30 or the relative vibration of the tool 23 and the workpiece 30.

After the phase of the vibration is adjusted by the vibration phase adjuster 13, the vibration phase setting unit 17 sets the phase of the vibration with respect to the different axis direction related to the vibration of the tool 23 or the workpiece 30 or the relative vibration of the tool 23 and the workpiece 30 based on the phase of the vibration adjusted by the vibration phase adjuster 13. For example, the vibration phase setting unit 17 sets the phase of the vibration with respect to the different axis direction based on the phase of the vibration adjusted by the vibration phase adjuster 13 and the related axial vibration command.

When the vibration of the tool 23 or the workpiece 30 and the relative vibration of the tool 23 and the workpiece 30 have different vibration frequencies, the vibration phase adjuster 13 may adjust at least one of the frequency and phase of the vibration caused by the vibration command or the frequency and phase of the vibration caused by the relative vibration command.

Figure 2:
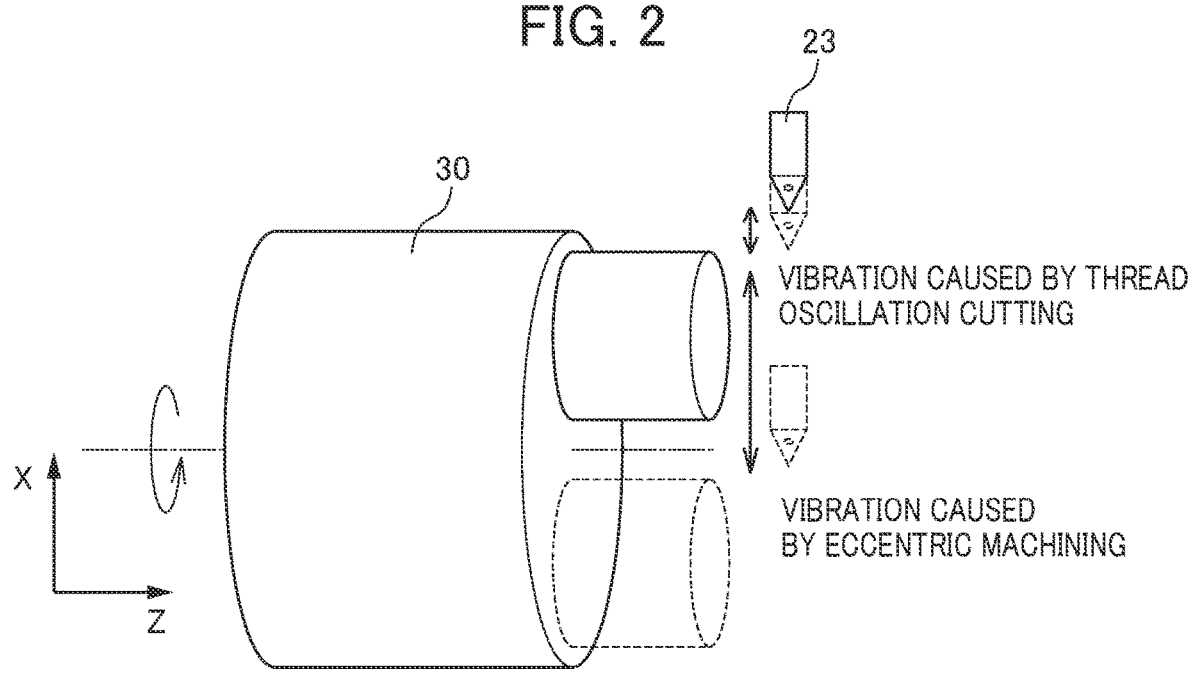
FIG. 2 is a view schematically illustrating oscillation cutting and eccentric machining of the first embodiment.

FIG. 2 is a view schematically illustrating oscillation cutting and eccentric machining of the first embodiment. As shown in FIG. 2, the machine tool 2 performs thread oscillation cutting with the tool 23 and eccentric machining of the workpiece 30.

In the example shown in FIG. 2, the thread oscillation cutting causes the vibration in the X axis direction, and the eccentric machining of the workpiece 30 also causes the vibration in the X axis direction.

The vibration caused by the thread oscillation cutting occurs based on the relative vibration command that causes the tool 23 and the workpiece 30 to relatively vibrate. The vibration caused by the eccentric machining occurs based on the vibration command that causes the tool 23 of the machine tool 2 to vibrate.

The following formula is used to calculate phase difference α between the vibration caused by the thread oscillation cutting and the vibration caused by the eccentric machining. The vibration caused by the eccentric machining is represented by A sin (Dω), and the vibration caused by the thread oscillation cutting is represented by B sin (Dω+α).

In this case, the composite vibration which is the composition of the vibration caused by the eccentric machining and the vibration caused by the thread oscillation cutting is represented by (R sin (Dω+sin$^{-1}$ ((B/R) sin α)). In this formula, A, B, and D are constants, and ω is angular velocity. In addition, R=√(A$^2$+B$^2$+2AB cos α) is met.

When the upper limit of the amplitude of the composite vibration is C, the phase difference α is represented by the following formula.

$$\alpha = \cos^{-1}\left((C^2 - A^2 - B^2)/2AB\right)$$

Time T corresponding to the phase difference α is represented by the following formula.

$$T = \alpha/D\omega$$

When α that minimizes R is calculated, the amplitude of the composite vibration can be minimized.

Figure 3:
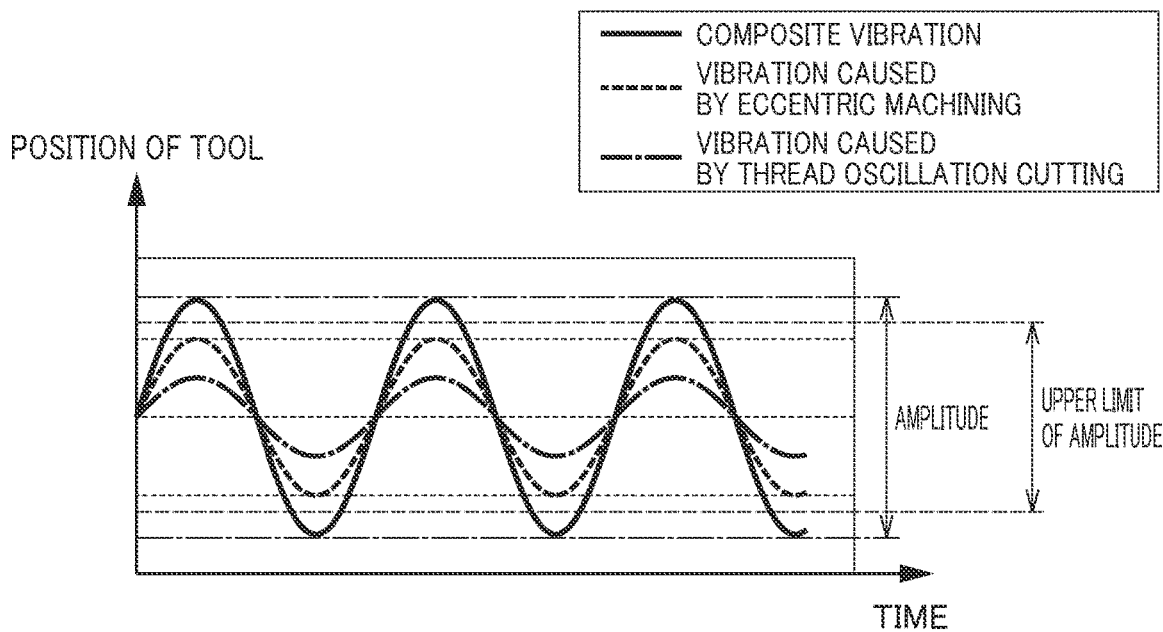
FIG. 3 is a chart of waveforms of vibrations caused by the oscillation cutting, eccentric machining, and composite vibration of the first embodiment.
Figure 4:
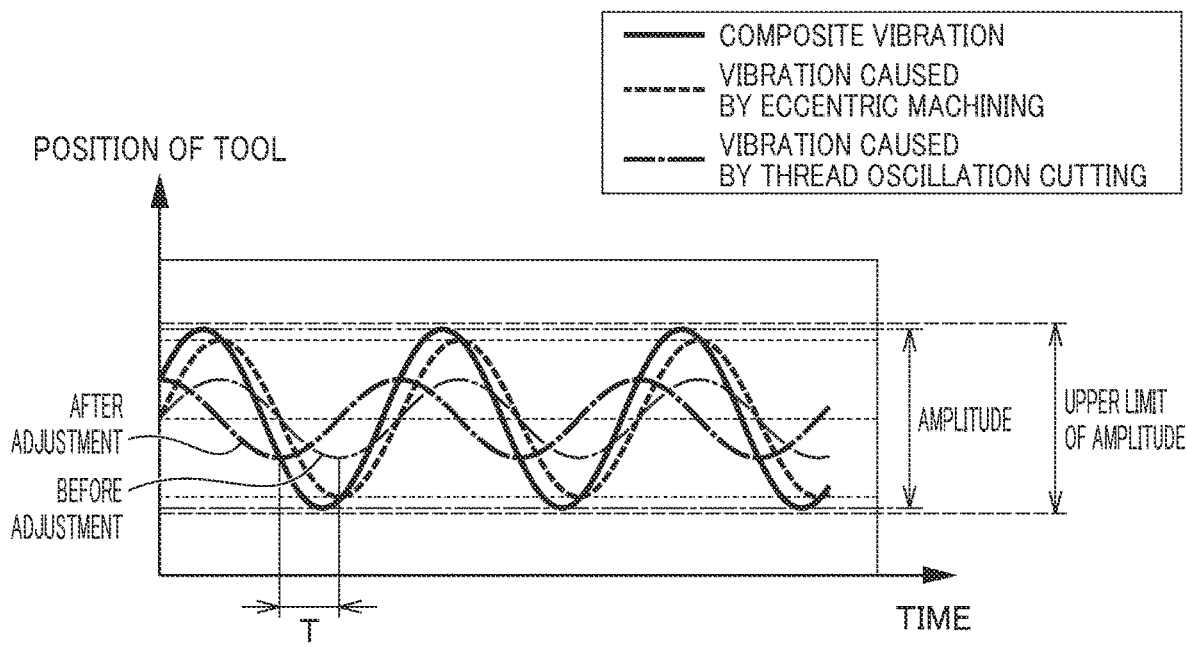
FIG. 4 is a chart of waveforms of vibrations caused by the oscillation cutting before and after adjustment of vibration phase, eccentric machining, and composite vibration of the first embodiment.

FIG. 3 is a chart of waveforms of the vibration caused by the oscillation cutting, vibration caused by the eccentric machining, and composite vibration of the first embodiment. FIG. 4 is a chart of waveforms of the vibration caused by the oscillation cutting before and after the vibration phase adjustment, vibration caused by the eccentric machining, and composite vibration of the first embodiment.

FIGS. 3 and 4 show the waveforms of the vibration caused by the thread oscillation cutting and the vibration caused by the eccentric machining shown in FIG. 2 and the composite vibration. The chart of the waveforms shown in FIGS. 3 and 4 has a horizontal axis representing time and a vertical axis representing the position of the tool 23 in the X direction.

In the example shown in FIG. 3, the amplitude is out of the allowable range. Likewise, the composite vibration may have the acceleration and the mechanical vibration and sound that are out of the allowable ranges. In this case, the control device 1 can avoid such a situation by the phase adjustment.

When the composite sum of amplitude, which is the sum of the amplitude of the vibration caused by the thread oscillation cutting and the amplitude of the vibration caused by the eccentric machining, exceeds the upper limit of the amplitude, the vibration phase adjuster 13 adjusts the phase difference α between the vibration caused by the thread oscillation cutting and the vibration caused by the eccentric machining to make the sum of the composite amplitude equal to or less than the upper limit of the amplitude.

Specifically, as shown in FIG. 4, the vibration phase adjuster 13 adjusts the phase of the vibration caused by the command for the thread oscillation cutting (relative vibration command) so that the vibration caused by the thread oscillation cutting stops for time T corresponding to the phase difference α. The vibration phase adjuster 13 may adjust the phase of the vibration caused by the command for the eccentric machining (vibration command) so that the vibration caused by the eccentric machining stops for time T corresponding to the phase difference α.

In place of the above-described process, the vibration phase adjuster 13 may adjust one or both of the phase of the vibration caused by the command for the thread oscillation cutting (relative vibration command) and the phase of vibration caused by the command for the eccentric machining (vibration command) so that the vibrations have the phase difference α.

Thus, the vibration phase adjustment makes the composite sum of amplitude equal to or less than the upper limit of the amplitude. The vibration phase adjuster 13 may adjust the phase difference α to minimize the composite sum of amplitude by calculating the phase difference α that minimizes R.

Figure 5:
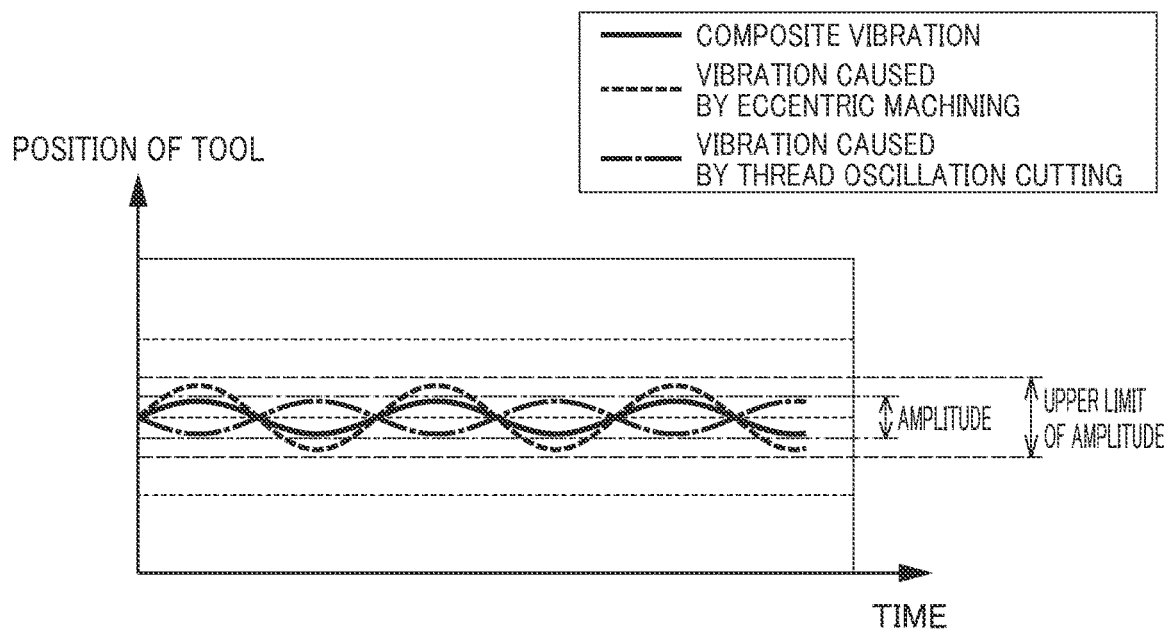
FIG. 5 is a chart of waveforms of vibrations caused by the oscillation cutting, eccentric machining, and composite vibration of the first embodiment.
Figure 6:
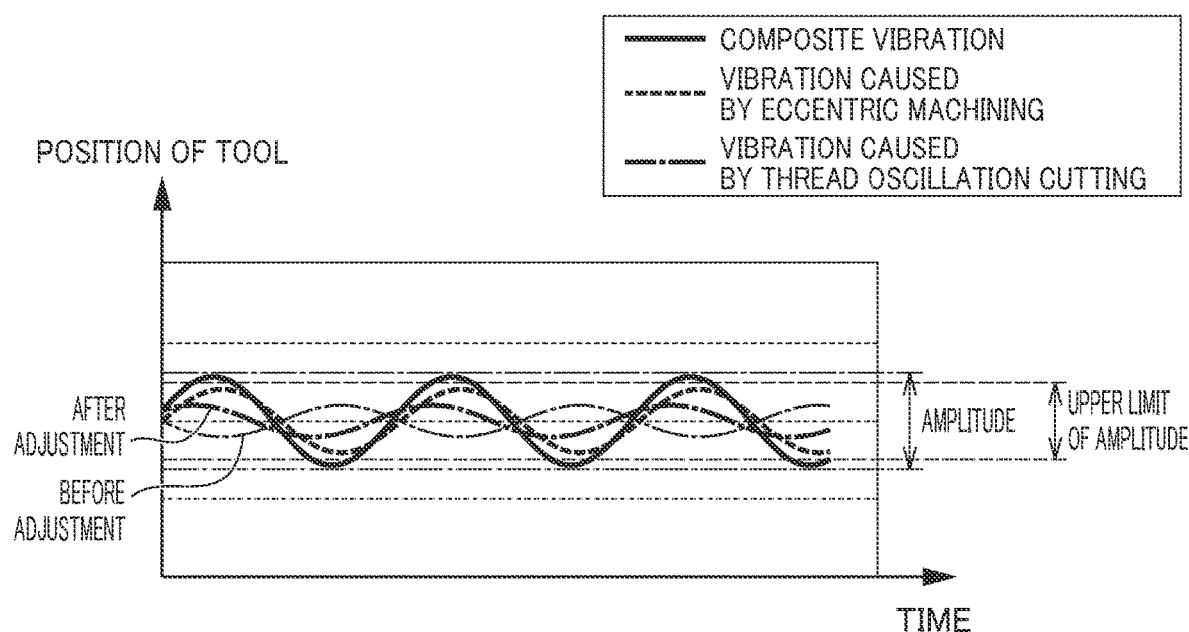
FIG. 6 is a chart of waveforms of vibrations caused by the oscillation cutting before and after adjustment of vibration phase, eccentric machining, and composite vibration of the first embodiment.

FIG. 5 is a chart of waveforms of the vibration caused by the oscillation cutting, vibration caused by the eccentric machining, and composite vibration of the first embodiment. FIG. 6 is a chart of waveforms of the vibration caused by the oscillation cutting before and after the vibration phase adjustment, vibration caused by the eccentric machining, and composite vibration of the first embodiment.

FIGS. 5 and 6 show, as FIGS. 3 and 4 do, the waveforms of the vibration caused by the thread oscillation cutting and the vibration caused by the eccentric machining shown in FIG. 2 and the composite vibration. Although FIG. 3 shows the example in which the composite sum of vibration, which is the sum of the amplitude of the vibration caused by the thread oscillation cutting and the amplitude of the vibration caused by the eccentric machining, exceeds the upper limit of the amplitude, FIG. 5 shows an example in which the composite sum of vibration falls below the lower limit of the amplitude.

When the composite sum of vibration falls below the lower limit of the amplitude, the machine tool 2 may cause fretting due to small vibrations. Thus, the machine tool 2 needs to increase the composite sum of vibration to avoid the fretting caused by the small vibrations.

When the composite sum of amplitude falls below the lower limit of the amplitude, the vibration phase adjuster 13 adjusts the phase difference α between the vibration caused by the thread oscillation cutting and the vibration caused by the eccentric machining to make the composite sum of amplitude equal to or greater than the lower limit of the amplitude.

Specifically, as shown in FIG. 6, the vibration phase adjuster 13 adjusts the phase of the vibration caused by the command for the thread oscillation cutting (relative vibration command) so that the vibration caused by the thread oscillation cutting stops for time T corresponding to the phase difference α. The vibration phase adjuster 13 may adjust the phase of the vibration caused by the command for the eccentric machining (vibration command) so that the vibration caused by the eccentric machining stops for time T corresponding to the phase difference α.

In place of the above-described process, the vibration phase adjuster 13 may adjust one or both of the phase of the vibration caused by the command for the thread oscillation cutting (relative vibration command) and the phase of vibration caused by the command for the eccentric machining (vibration command) so that the vibrations have the phase difference α. Thus, the vibration phase adjustment makes the composite sum of amplitude equal to or greater than the lower limit of the amplitude.

In the examples shown in FIGS. 3 to 6, the phase adjustment is performed after the phase difference α is calculated in advance. However, in these examples, the composite sum of amplitude may not be obtained in advance unless the machine tool is operated. For example, an actual amplitude of vibration of a tool edge caused by the composite vibration is difficult to calculate in advance due to the influence of mechanical properties, making the calculation of the phase difference α difficult. In such a case, for the phase adjustment, the control device 1 may gradually shift two phases of vibration based on the feedback from a sensor capable of directly observing the composite sum of amplitude and may stop shifting the two phases of vibration when the composite sum of amplitude reaches a desired value.

Figure 7:
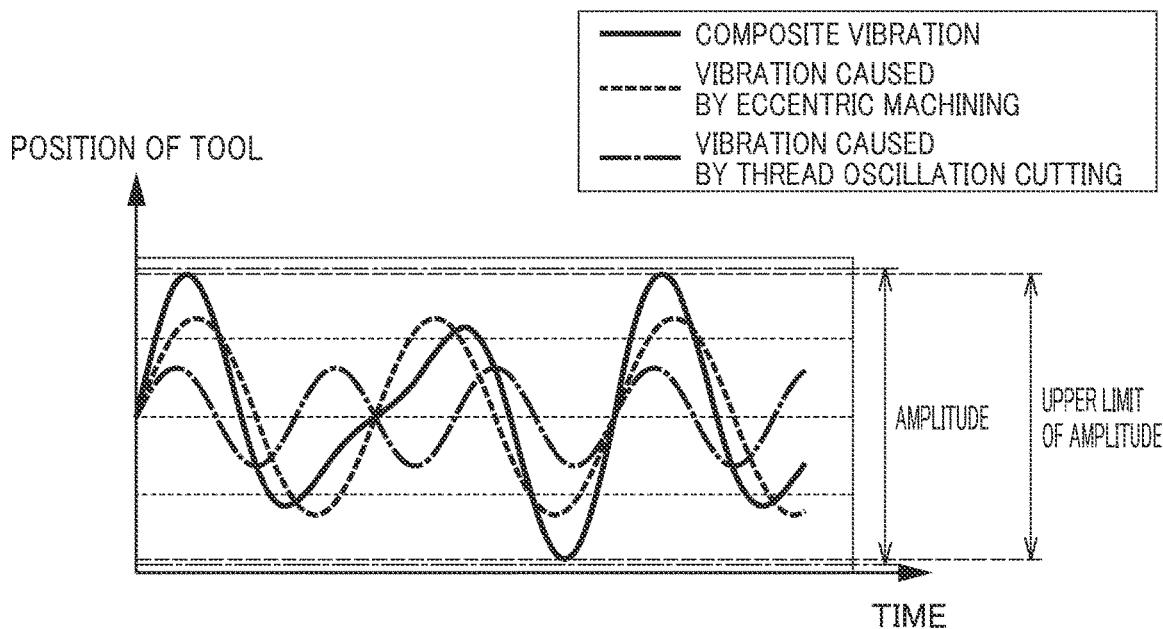
FIG. 7 is a chart of waveforms of vibrations caused by the oscillation cutting, eccentric machining, and composite vibration of the first embodiment.
Figure 8:
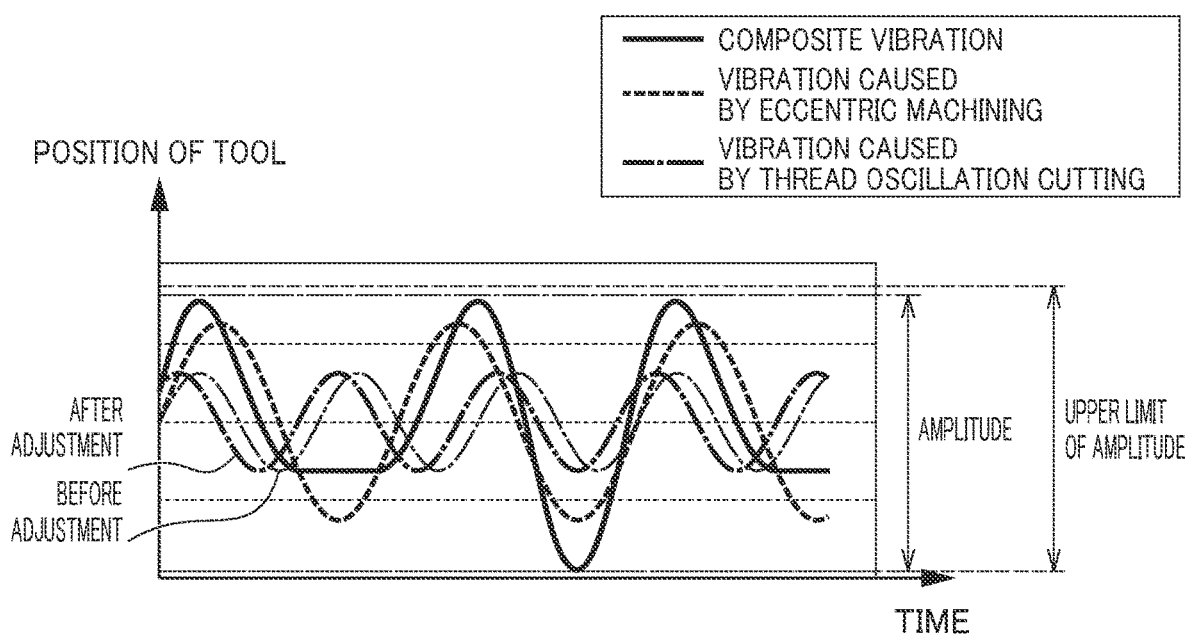
FIG. 8 is a chart of waveforms of vibrations caused by the oscillation cutting before and after adjustment of vibration phase, eccentric machining, and composite vibration of the first embodiment.

FIG. 7 is a chart of waveforms of the vibration caused by the oscillation cutting, vibration caused by the eccentric machining, and composite vibration of the first embodiment. FIG. 8 is a chart of waveforms of the vibration caused by the oscillation cutting before and after the vibration phase adjustment, vibration caused by the eccentric machining, and composite vibration of the first embodiment.

FIGS. 7 and 8 show, as FIGS. 3 and 4 do, the waveforms of the vibration caused by the thread oscillation cutting and the vibration caused by the eccentric machining shown in FIG. 2 and the composite vibration. Although FIGS. 3 and 4 show the examples in which the vibration caused by the thread oscillation cutting and the vibration caused by the eccentric machining have the same vibration frequency, FIGS. 7 and 8 show examples in which the vibration caused by the thread oscillation cutting and the vibration caused by the eccentric machining do not have the same vibration frequency.

In the examples shown in FIGS. 7 and 8, as in the examples shown in FIGS. 3 and 4, when the composite sum of amplitude, which is the sum of the amplitude of the vibration caused by the thread oscillation cutting and the amplitude of the vibration caused by the eccentric machining, exceeds the upper limit of the amplitude, the vibration phase adjuster 13 adjusts the phase difference α between the vibration caused by the thread oscillation cutting and the vibration caused by the eccentric machining to make the composite sum of amplitude equal to or less than the upper limit of the amplitude.

Figure 9:
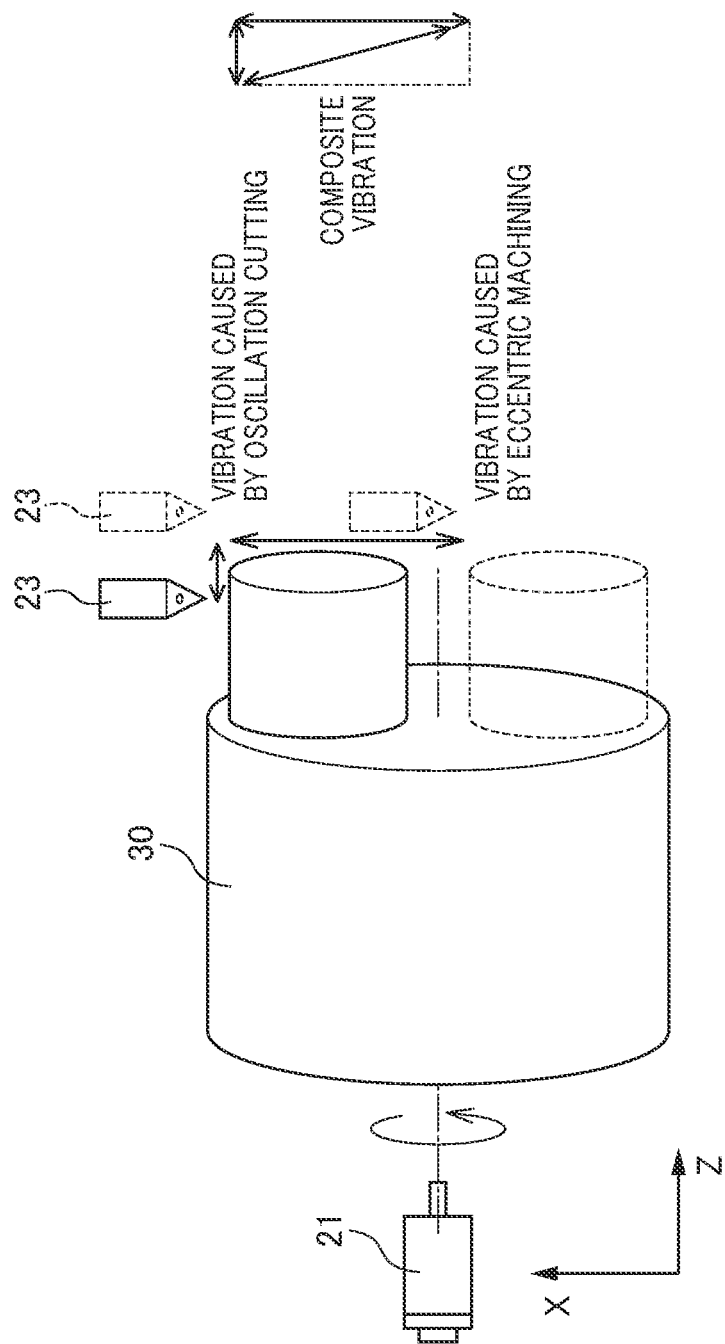
FIG. 9 is a view schematically illustrating the oscillation cutting and eccentric machining of the first embodiment.

FIG. 9 is a view schematically illustrating the oscillation cutting and eccentric machining of the first embodiment. Although FIG. 3 shows the example in which each of the eccentric machining and the thread oscillation cutting causes the vibration in the X axis direction, FIG. 9 shows an example in which the eccentric machining causes the vibration in the X axis direction, and the oscillation cutting causes the vibration in the Z axis direction. Specifically, the composite vibration is the composition of the vibration in the X axis direction caused by the eccentric machining and the vibration in the Z axis direction caused by the oscillation cutting.

Although the vibration caused by the eccentric machining and the vibration caused by the oscillation cutting do not occur on the same axis as in the example shown in FIG. 9, the vibration phase adjuster 13 adjusts the phase difference α between the vibration caused by the oscillation cutting and the vibration caused by the eccentric machining when the composite sum of amplitude exceeds the upper limit of the amplitude to make the composite sum of amplitude, which is the sum of the amplitude of the vibration caused by the oscillation cutting and the amplitude of the vibration caused by the eccentric machining, equal to or less than the upper limit of the amplitude.

Thus, the vibration phase adjustment makes the composite sum of amplitude equal to or less than the upper limit of the amplitude, and the control device 1 can reduce the maximum acceleration and other parameters of the composite vibration.

Figure 10:
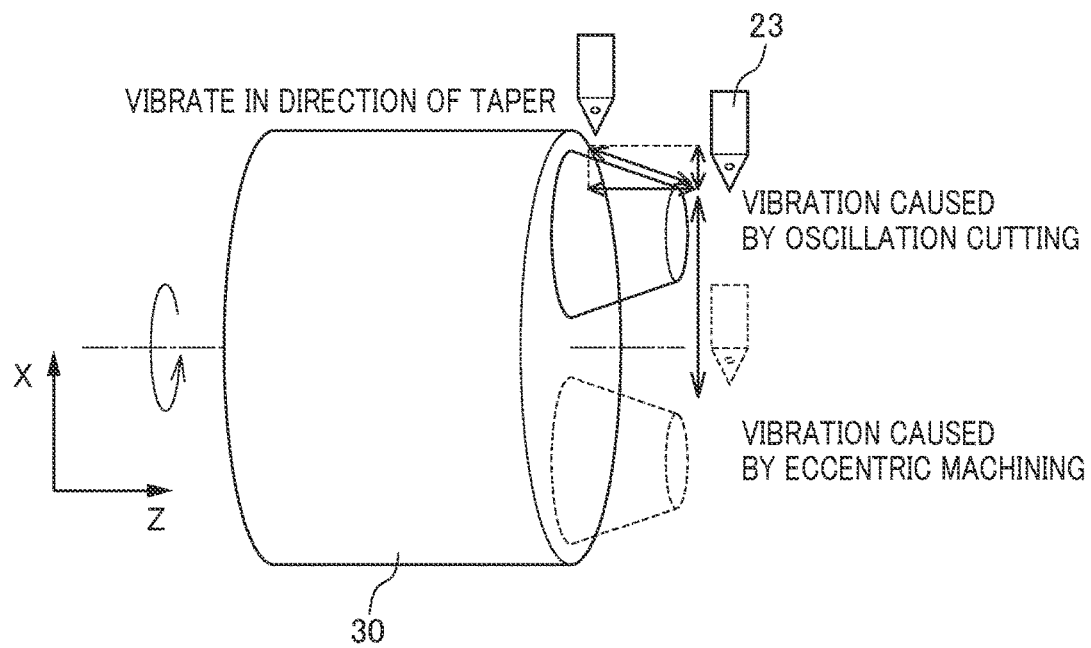
FIG. 10 is a view schematically illustrating the oscillation cutting and eccentric machining of the first embodiment.

FIG. 10 is a view schematically illustrating the oscillation cutting and eccentric machining of the first embodiment. In the example shown in FIG. 10, the oscillation cutting is performed in a direction of the taper of an eccentric workpiece 30. Thus, in the example shown in FIG. 10, the eccentric machining causes the vibration in the X axis direction, and the oscillation cutting causes the vibration in the X and Z axis directions.

In such a case, when the composite sum of amplitude, which is the sum of the amplitude of the vibration in the X axis direction caused by the oscillation cutting and the amplitude of the vibration in the X axis direction of the eccentric machining, exceeds the upper limit of the amplitude, the vibration phase adjuster 13 adjusts the phase difference α between the vibration caused by the oscillation cutting and the vibration caused by the eccentric machining to make the composite sum of amplitude equal to or less than the upper limit of the amplitude.

Based on the phase difference α (phase of vibration) adjusted by the vibration phase adjuster 13, the vibration phase setting unit 17 sets the phase of the vibration with respect to the Z axis direction (i.e., the different axis direction) related to the vibration caused by the oscillation cutting to maintain the phase of the vibration in the X axis direction caused by the oscillation cutting and the phase of the vibration in the Z axis direction caused by the oscillation cutting.

When the phase of vibration is set in this manner, the machine tool 2 can cause the tool 23 to vibrate in the direction of the taper of the workpiece 30 in the thread oscillation cutting.

When the vibration caused by the eccentric machining and the vibration caused by the oscillation cutting have different vibration frequencies, the oscillation cutting adjuster 13 may adjust at least one of the frequency and phase of the vibration caused by the command for the oscillation cutting (relative vibration command) or the frequency and phase of the vibration caused by the command for the eccentric machining (vibration command).

Specifically, when the vibration caused by the eccentric machining has a frequency of 10 Hz and an amplitude of 1.00 mm, and the vibration caused by the oscillation cutting has a frequency of 6 Hz and an amplitude of 0.50 mm, the minimum value of the amplitude of the composite vibration (the minimum amplitude achieved by the vibration phase adjustment) is 1.35 mm.

In this case, however, the minimum value of the amplitude of the composite vibration (1.35 mm) exceeds the upper limit of the amplitude of the composite vibration, which is 1.30 mm. Thus, the vibration phase adjuster 13 adjusts the frequency and phase of the vibration caused by the command for the oscillation cutting when the vibration caused by the eccentric machining and the vibration caused by the oscillation cutting have different vibration frequencies.

Specifically, the vibration phase adjuster 13 changes the frequency of the vibration caused by the oscillation cutting from 6 Hz to 5 Hz and adjusts the phase of the vibration. This changes the minimum value of the amplitude of the composite vibration (the minimum amplitude achieved by the vibration phase adjustment) to 1.27 mm. As a result, the minimum value of the amplitude of the composite vibration (1.27 mm) falls below the upper limit of the amplitude of the composite vibration, which is 1.30 mm.

Although the control device 1 described above adjusts the phase to adjust the composite sum of amplitude, the control device 1 can adjust two phases of vibration so that any one of the parameters that are influenced by the composite vibration, such as the acceleration of the composite vibration, the magnitude of vibration (amplitude or acceleration) of a particular part of a drive mechanism, and vibration of the whole device.

Figure 11:
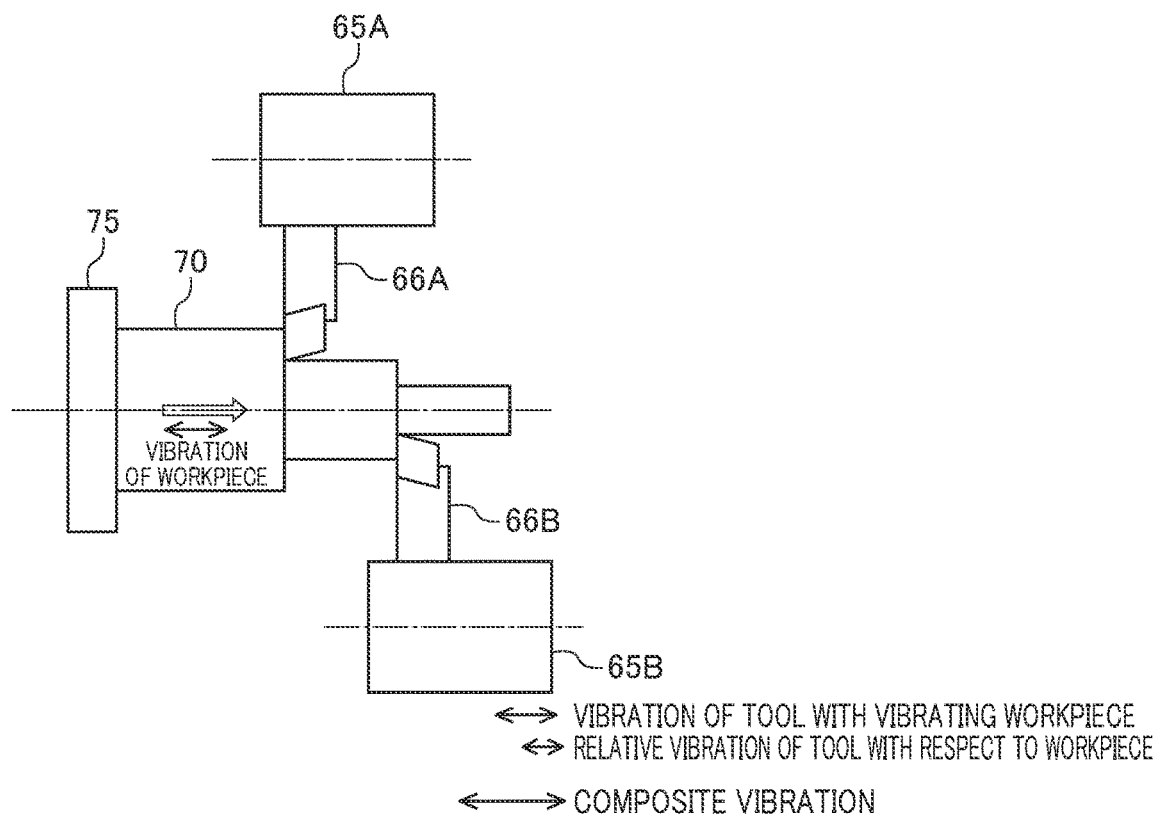
FIG. 11 is a view schematically illustrating an example of two types of oscillation cutting of the first embodiment.

FIG. 11 is a view schematically illustrating an example of two types of oscillation cutting of the first embodiment. In the example shown in FIG. 11, the machine tool 2 performs, in place of the oscillation cutting and eccentric machining described above, two types of oscillation cutting for the machining of a workpiece 70. Specifically, the machine tool 2 performs the oscillation cutting with a fixed tool rest 65A and a movable headstock 75 and relative oscillation cutting with the movable headstock 75 and a movable tool rest 65B.

The oscillation cutting with the fixed tool rest 65A and the movable headstock 75 allows a tool 66A to machine the workpiece 70, and the relative oscillation cutting with the movable headstock 75 and the movable tool rest 65B allows a tool 66B to machine the workpiece 70.

In this case, the oscillation cutting with the fixed tool rest 65A and the movable headstock 75 causes the tool 66A to vibrate against the vibrating workpiece 70. The relative oscillation cutting with the movable headstock 75 and the movable tool rest 65B causes the tool 66B to vibrate relative to the workpiece 70.

The vibration caused by the relative oscillation cutting with the movable headstock 75 and the movable tool rest 65B occurs in accordance with a relative vibration command that causes the workpiece 70 and the tool 66B to relatively vibrate. The vibration caused by the oscillation cutting with the fixed tool rest 65A and the movable headstock 75 occurs in accordance with a vibration command that causes the tool 23 of the machine tool 2 to vibrate.

In the example of FIG. 11, when a composite sum of amplitude, which is the sum of the amplitude of the vibration caused by the relative oscillation cutting with the movable headstock 75 and the movable tool rest 65B and the amplitude of the vibration caused by the oscillation cutting with the fixed tool rest 65A and the movable headstock 75, exceeds the upper limit of the amplitude, the vibration phase adjuster 13 adjusts a phase difference between the vibration caused by the relative oscillation cutting and the vibration caused by the oscillation cutting to make the composite sum of amplitude equal to or less than the upper limit of the amplitude.

When the composite sum of amplitude falls below the lower limit of the amplitude, the vibration phase adjuster 13 adjusts the phase difference between the vibration caused by the relative oscillation cutting and the vibration caused by the oscillation cutting to make the composite sum of amplitude equal to or greater than the lower limit of the amplitude.

Thus, the control device 1 can reduce the maximum acceleration and other parameters of the composite vibration when the workpiece is machined by superposition control combining the vibration caused by the relative oscillation cutting using the movable headstock 75 and the movable tool rest 65B with the oscillation cutting using the fixed tool rest 65A and the movable headstock 75.

Figure 12:
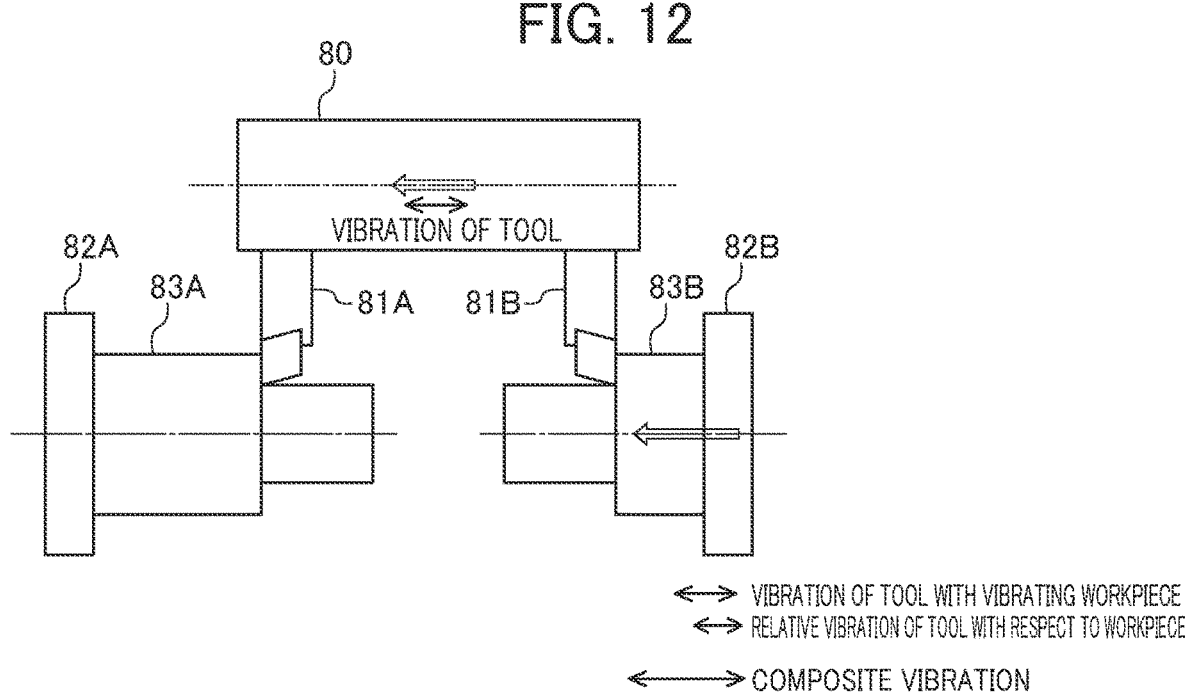
FIG. 12 is a view schematically illustrating another example of two types of oscillation cutting of the first embodiment.

FIG. 12 is a view schematically illustrating an example of two types of oscillation cutting of the first embodiment. In the example shown in FIG. 12, the machine tool 2 performs, as in the example of FIG. 11, two types of oscillation cutting to machine workpieces 83A and 83B. Specifically, the machine tool 2 performs the oscillation cutting with a fixed headstock 82A and a movable tool rest 80 and relative oscillation cutting with the movable tool rest 80 and a movable headstock 82B.

The oscillation cutting with the fixed headstock 82A and the movable tool rest 80 allows a tool 81A to machine the workpiece 83A, and the relative oscillation cutting with the movable tool rest 80 and the movable headstock 82B allows a tool 81B to machine the workpiece 83B.

In this case, the oscillation cutting with the fixed headstock 82A and the movable tool rest 80 causes the tool 81A to vibrate. The relative oscillation cutting with the movable tool rest 80 and the movable headstock 82B causes the tool 81B to vibrate relative to the workpiece 83B.

The vibration caused by the relative oscillation cutting with the movable tool rest 80 and the movable headstock 82B occurs in accordance with a relative vibration command that causes the tool 81B and the workpiece 83B to relatively vibrate. The vibration caused by the oscillation cutting with the fixed headstock 82A and the movable tool rest 80 occurs in accordance with a vibration command that causes the tool 81A to vibrate.

In the example of FIG. 12, when a composite sum of amplitude, which is the sum of the amplitude of the vibration caused by the relative oscillation cutting with the movable tool rest 80 and the movable headstock 82B and the amplitude of the vibration caused by the oscillation cutting with the fixed headstock 82A and the movable tool rest 80, exceeds the upper limit of the amplitude, the vibration phase adjuster 13 adjusts a phase difference between the vibration caused by the relative oscillation cutting and the vibration caused by the oscillation cutting to make the composite sum of amplitude equal to or less than the upper limit of the amplitude.

The vibration phase adjuster 13 may adjust the phase difference to minimize a parameter of the composite vibration such as the composite sum of amplitude. Thus, the control device 1 can reduce a load on the machine tool when the machining is performed by superposition control combining the vibration caused by the relative oscillation cutting using the movable tool rest 80 and the movable headstock 82B with the oscillation cutting using the fixed headstock 82A and the movable tool rest 80.

When the composite sum of amplitude falls below the lower limit of the amplitude, the vibration phase adjuster 13 adjusts the phase difference between the vibration caused by the relative oscillation cutting and the vibration caused by the oscillation cutting to make the composite sum of amplitude equal to or greater than the lower limit of the amplitude.

Thus, the control device 1 can reduce fretting wear during the machining performed by superposition control combining the vibration caused by the relative oscillation cutting using the movable tool rest 80 with the movable headstock 82B and the oscillation cutting using the fixed headstock 82A and the movable tool rest 80.

Figure 13:
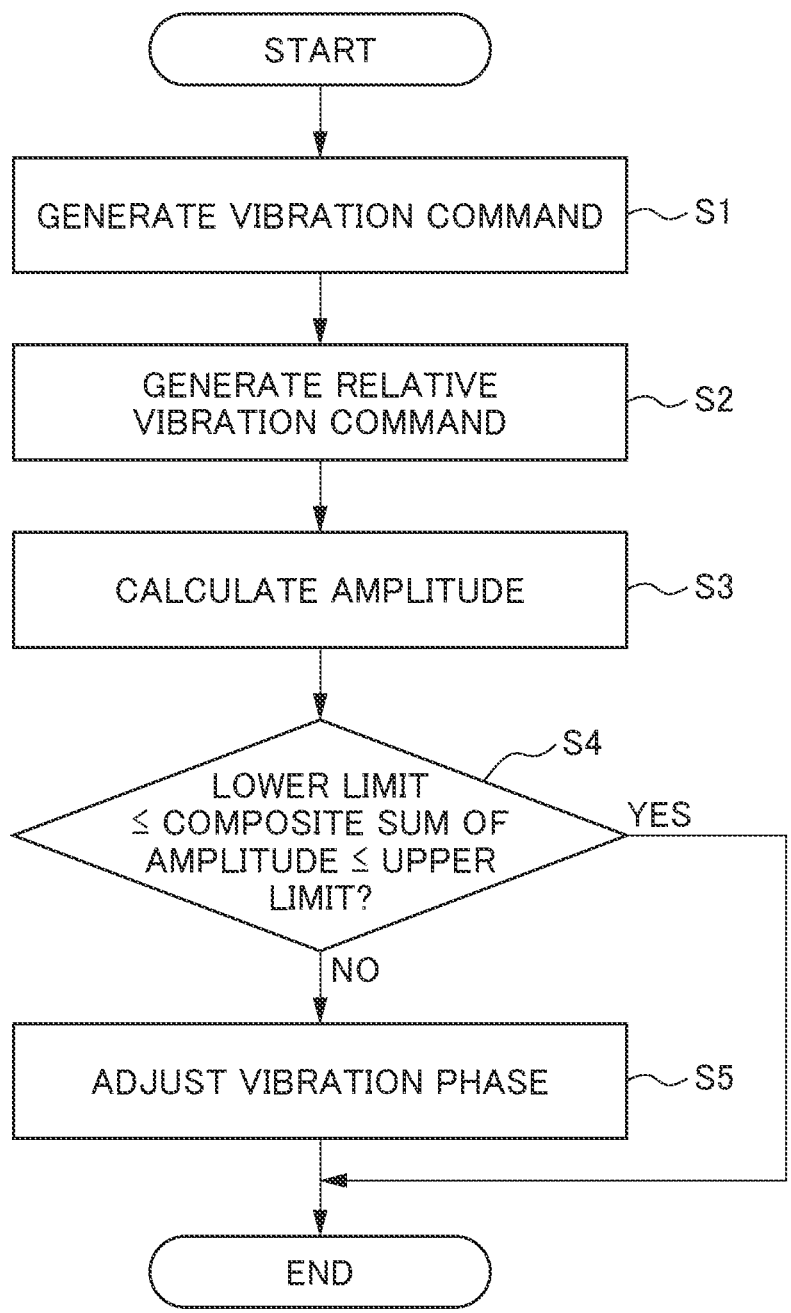
FIG. 13 is a flowchart illustrating a flow of processes performed by a control device of the first embodiment.

FIG. 13 is a flowchart illustrating a flow of processes performed by the control device 1 of the first embodiment. In Step S1, the vibration command generator 11 generates a vibration command to cause the tool 23 of the machine tool 2 or the workpiece 30 to vibrate. In Step S2, the relative vibration command generator 12 generates a relative vibration command to cause the tool 23 and the workpiece 30 to relatively vibrate.

In Step S3, the amplitude calculator 14 calculates the amplitude of the vibration of the tool 23 or the workpiece 30 based on the vibration command and calculates the amplitude of the relative vibration of the tool 23 and the workpiece 30 based on the relative vibration command.

In Step S4, the determination unit 15 determines whether the composite sum of amplitude, which is the sum of the amplitude of the vibration of the tool 23 or the workpiece 30 and the amplitude of the relative vibration of the tool 23 and the workpiece 30, is equal to or less than the upper limit of the amplitude or equal to or greater than the lower limit of the amplitude. When the composite sum of amplitude is equal to or less than the upper limit of the amplitude or equal to or greater than the lower limit of the amplitude (YES is selected), the process ends. When the composite sum of amplitude exceeds the upper limit of the amplitude or falls below the lower limit of the amplitude (NO is selected), the process proceeds to Step S5.

In Step S5, the vibration phase adjuster 13 adjusts at least one of the phase of the vibration caused by the vibration command or the phase of the vibration caused by the relative vibration command based on the vibration command and the relative vibration command.

As described above, the control device 1 of the first embodiment includes the vibration command generator 11 that generates the vibration command to cause the tool of the machine tool 2 or the workpiece to vibrate, the relative vibration command generator 12 that generates the relative vibration command to cause the tool and the workpiece to relatively vibrate, and the vibration phase adjuster 13 that adjusts at least one of the phase of the vibration caused by the vibration command or the phase of the vibration caused by the relative vibration command based on the vibration command and the relative vibration command.

Thus, the control device 1 adjusts at least one of the phase of the vibration caused by the vibration command or the phase of the vibration caused by the relative vibration command based on the vibration command and the relative vibration command, appropriately adjusting the composite vibration which is a composition of the vibration of the tool or the workpiece and the relative vibration of the tool and the workpiece. The control device 1 can minimize or maximize factors attributable to the composite vibration (e.g., amplitude and acceleration of the composite vibration and the vibration and sound made by the whole machine tool 2) as much as possible.

The vibration phase adjuster 13 adjusts at least one of the phase of the vibration caused by the vibration command or the phase of the vibration caused by the relative vibration command so that a parameter of composite vibration, which is a composition of the vibration caused by the vibration command and the vibration caused by the relative vibration command, has a predetermined value. Thus, the control device 1 can adjust the parameter of the composite vibration to a suitable value.

The control device 1 further includes the determination unit 15 that determines whether the parameter is within the predetermined allowable range, and the vibration phase adjuster 13 adjusts at least one of the phase of the vibration caused by the vibration command or the phase of the vibration caused by the relative vibration command when the parameter is out of the allowable range. This allows the control device 1 to appropriately adjust the vibration phase when the parameter is out of the allowable range.

The control device 1 further includes the amplitude calculator 14 that calculates the amplitude of the vibration of the tool or the workpiece based on the vibration command and calculates the amplitude of the relative vibration of the tool and the workpiece based on the relative vibration command. The determination unit 15 determines whether the composite sum of amplitude, which is the parameter and the sum of the amplitude of the vibration of the tool or the workpiece and the amplitude of the relative vibration of the tool and the workpiece, is equal to or less than the upper limit of the amplitude having the allowable range. The vibration phase adjuster 13 adjusts at least one of the phase of the vibration caused by the vibration command or the phase of the variation caused by the relative vibration command when the composite sum of amplitude exceeds the upper limit of the amplitude. This allows the control device 1 to appropriately adjust the vibration phase when the composite sum of amplitude exceeds the upper limit of the amplitude.

The control device 1 further includes the amplitude calculator 14 that calculates the amplitude of the vibration of the tool or the workpiece based on the vibration command and calculates the amplitude of the relative vibration of the tool and the workpiece based on the relative vibration command. The determination unit 15 determines whether the composite sum of amplitude, which is the parameter and the sum of the amplitude of the vibration of the tool or the workpiece and the amplitude of the relative vibration of the tool and the workpiece, is equal to or greater than the lower limit of the amplitude having the allowable range. The vibration phase adjuster 13 adjusts the vibration phase of at least one of the vibration command or the relative vibration command when the composite vibration sum falls below the lower limit of the amplitude. This allows the control device 1 to appropriately adjust the vibration phase when the composite sum of amplitude falls below the lower limit of the amplitude.

The control device 1 further includes the vibration phase setting unit 17 that sets the phase of the vibration with respect to the different axis direction related to the vibration command or the relative vibration command based on the phase of the vibration adjusted by the vibration phase adjuster 13. This allows the control device 1 to appropriately set the phase of the vibration with respect to the different axis direction to an appropriate value after the adjustment of the composite vibration.

The vibration phase adjuster 13 adjusts at least one of the frequency and phase of the vibration caused by the vibration command or the frequency and phase of the vibration caused by the relative vibration command when the vibration caused by the vibration command and the vibration caused by the relative vibration command have different frequencies. Thus, the control device 1 can adjust not only the phase, but the frequency, of the vibration, further reducing the composite vibration.

Second Embodiment

A control device 10 of the second embodiment will be described below. In the second embodiment, the same components as those described in the first embodiment are designated by the same reference numerals, and the description of such components are skipped or simplified.

The control device 10 of the second embodiment is configured in the same manner as the control device of the first embodiment except that the relative vibration command generator and the vibration phase adjuster are replaced with a relative move command generator that generates a relative move command to cause the tool and the workpiece to relatively move and a command adjuster that adjusts parameters of the vibration command and the relative move command.

Figure 14:
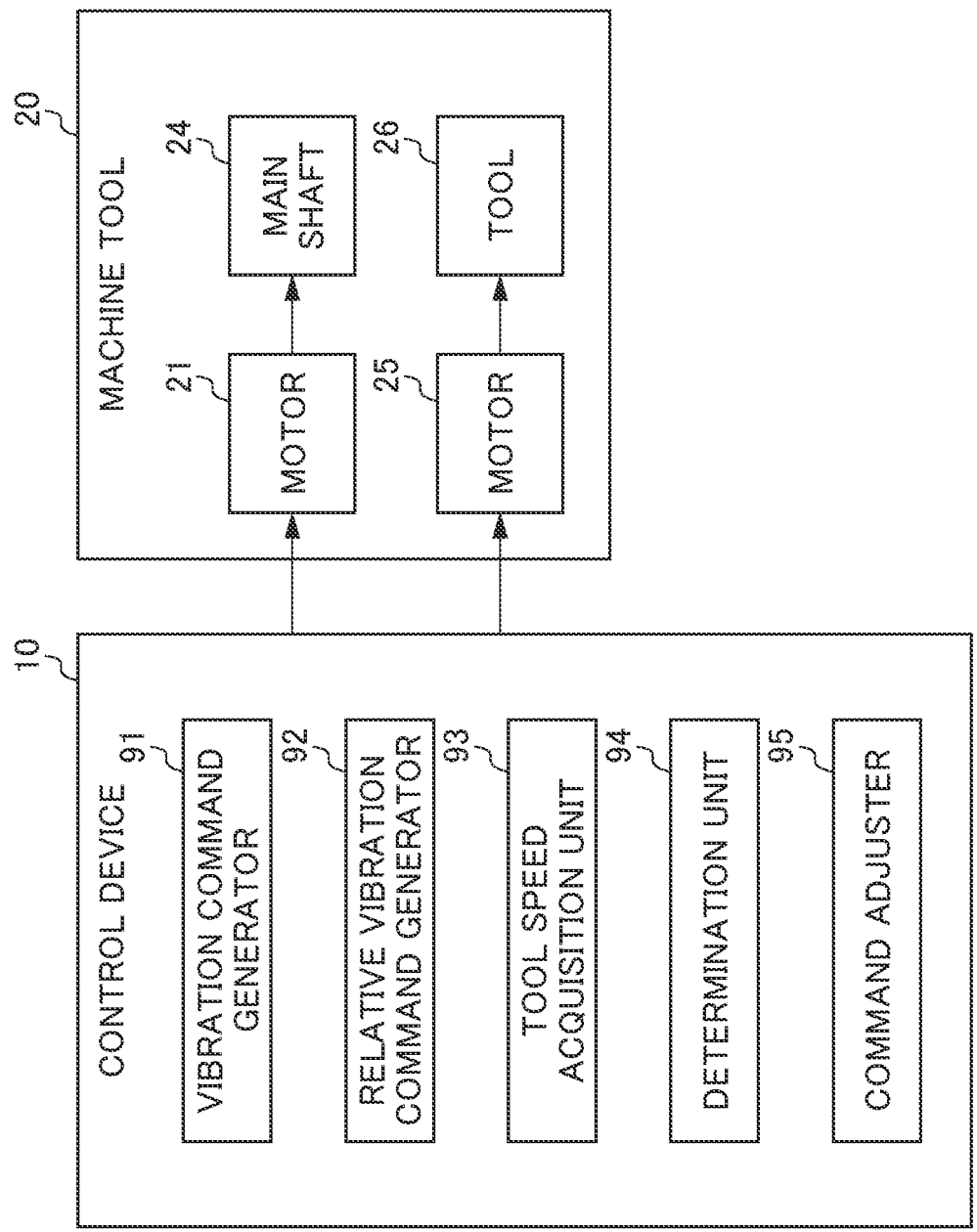
FIG. 14 is a view schematically illustrating a control device of a second embodiment.
Figure 15:
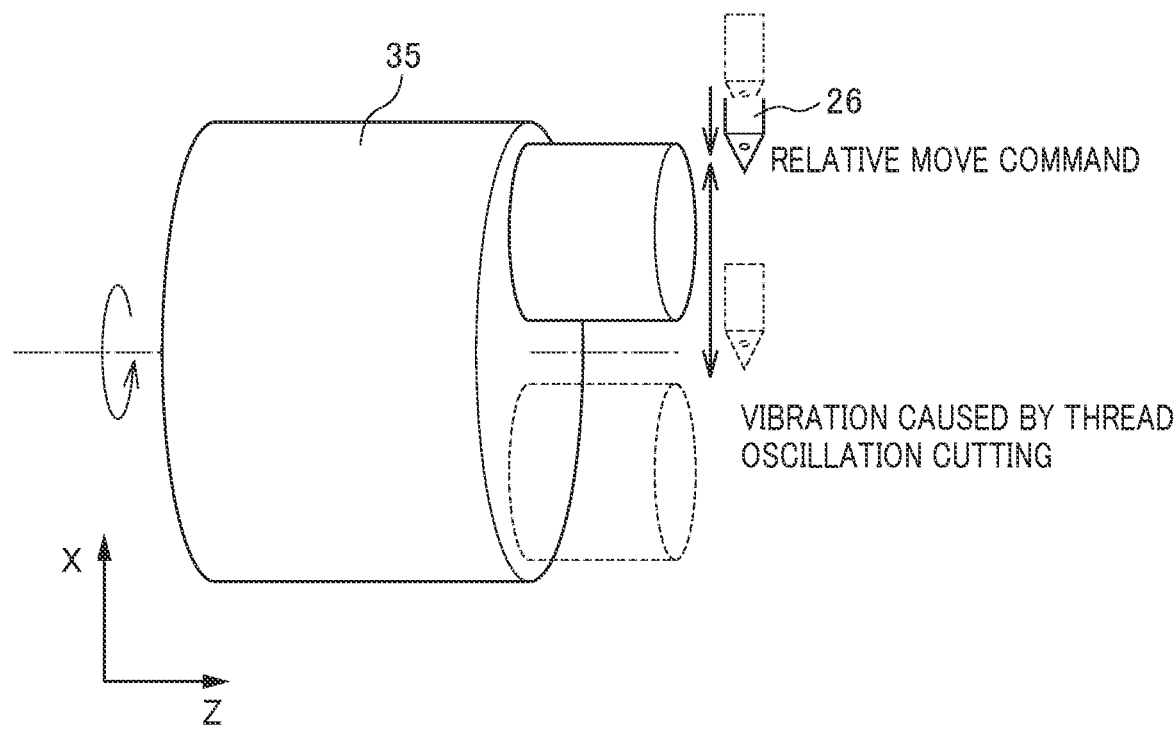
FIG. 15 is view schematically illustrating relative movement and eccentric machining of the second embodiment.

FIG. 14 is a view schematically illustrating the control device 10 of the second embodiment. The control device 10 is a device that controls a machine tool 20, and is, for example, a numerical control device. FIG. 15 is view schematically illustrating relative movement and eccentric machining of the second embodiment.

The machine tool 20 positions a tool 26 relative to a workpiece 35 and performs eccentric machining of the workpiece 35. In the example shown in FIG. 15, a relative move command causes the tool 26 to move relative to the workpiece 35 in the X axis direction, and the eccentric machining of the workpiece 35 also causes the vibration in the X axis direction. The machine tool 20 includes motors 21 and 25. The motor 21 drives and controls, for example, a main shaft 24, and the motor 25 drives and controls the tool 26.

The control device 10 includes a vibration command generator 91, a relative move command generator 92, a tool speed acquisition unit 93, a determination unit 94, and a command adjuster 95.

The vibration command generator 91 generates a vibration command that causes at least the tool 26 of the machine tool 2 or the workpiece 35 to vibrate. Specifically, the vibration command generator 91 generates a vibration command to cause the workpiece 35 to vibrate for the eccentric machining.

The relative move command generator 92 generates a relative move command to cause at least the tool 26 and the workpiece 35 to relatively move.

The tool speed acquisition unit 93 acquires, based on at least the relative move command and the vibration command, a first moving speed of the tool 26 that is moved relative to the workpiece 35 by the relative move command and a second moving speed of the tool 26 that is moved by the vibration caused by the eccentric machining.

The determination unit 94 determines whether a composite sum of speed, which is the sum of the first and second moving speeds acquired by the tool speed acquisition unit 93, exceeds an upper limit of the speed.

The command adjuster 95 adjusts at least one of a plurality of parameters of the vibration command and the relative move command based on the vibration command and the relative move command. Specifically, when the composite sum of speed exceeds the upper limit of the speed, the command adjuster 95 adjusts timing for executing the relative move command that moves the tool 26 relative to the workpiece 35 to make the composite sum of speed equal to or less than the upper limit of the speed. When the composite sum of speed exceeds the upper limit of the speed, the command adjuster 95 adjusts the moving speed of the tool 26 that is moved relative to the workpiece 35 by the relative move command.

Figure 16:
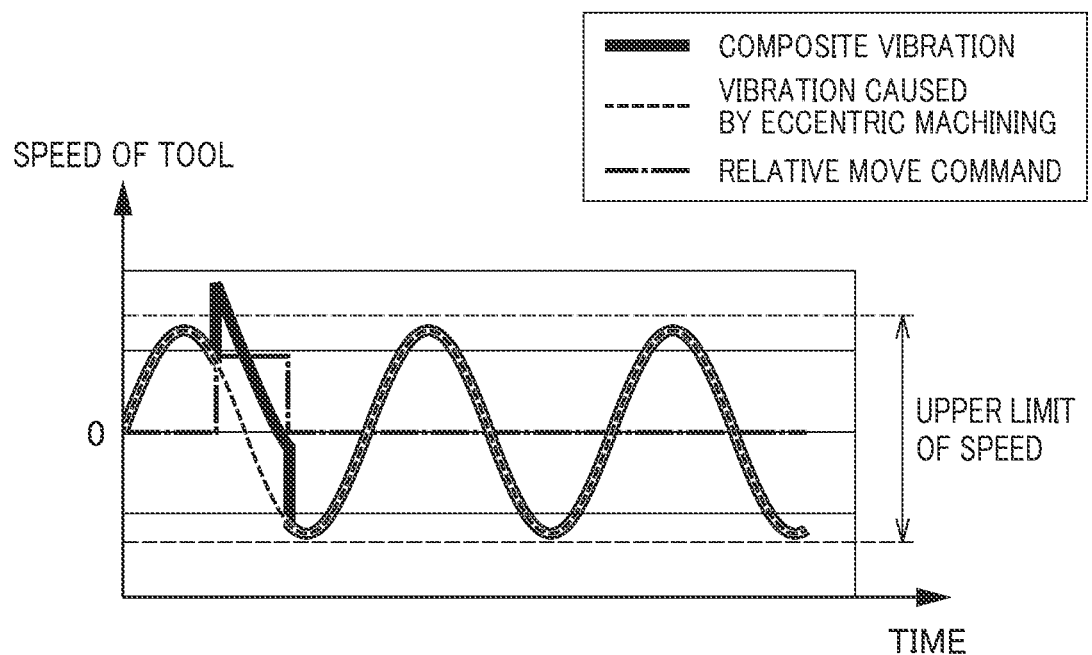
FIG. 16 is a graph of moving speeds of a tool of the second embodiment.
Figure 17:
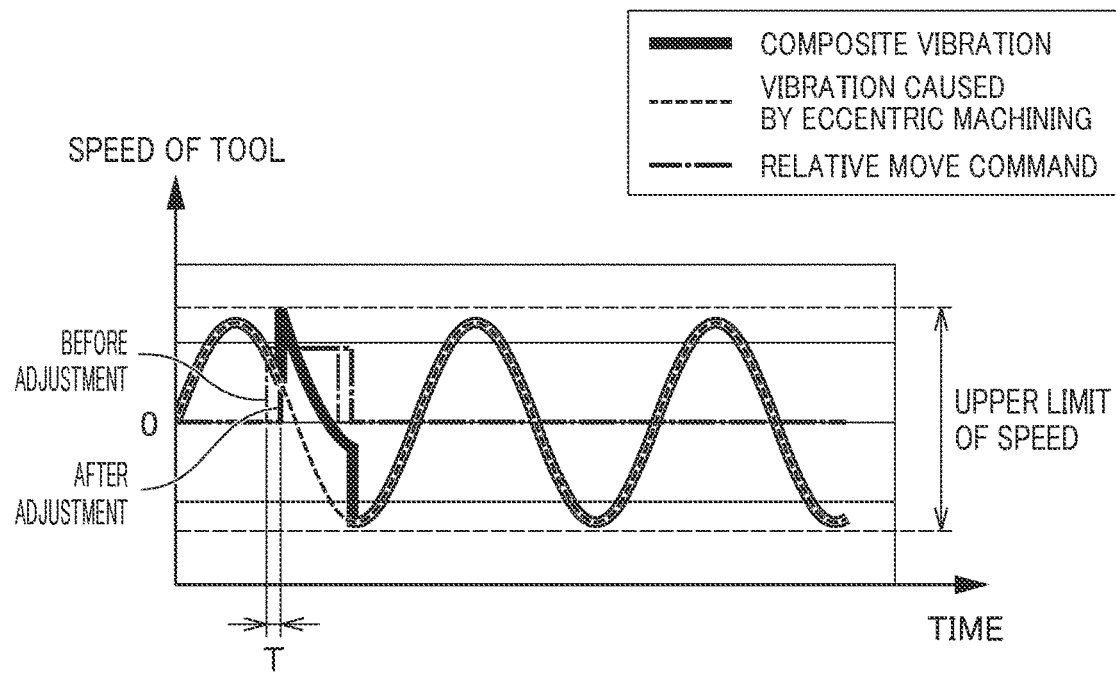
FIG. 17 is a graph of the moving speeds of the tool of the second embodiment.
Figure 18:
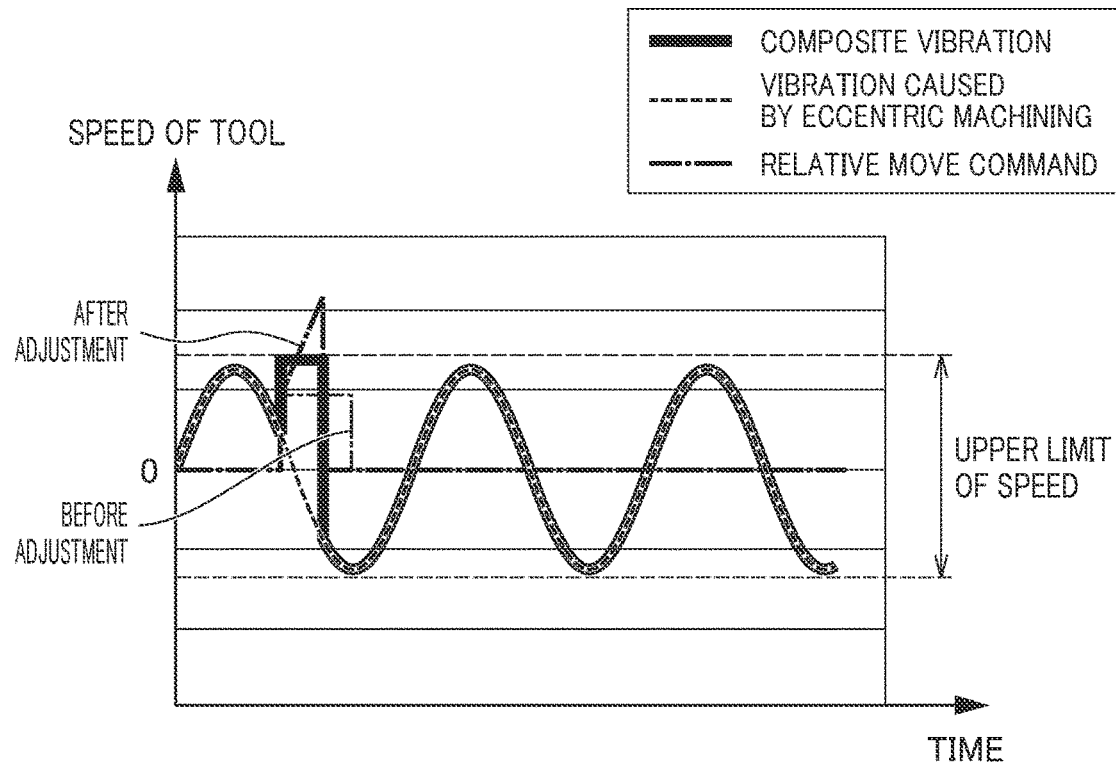
FIG. 18 is a graph of the moving speeds of the tool of the second embodiment.

FIGS. 16 to 18 are graphs of the moving speeds of the tool 26 of the second embodiment. Specifically, FIG. 16 is a graph that is related to the second embodiment and illustrates the first moving speed of the tool 26 that is moved relative to the workpiece 35 by the relative move command, the second moving speed of the tool 26 that is moved by the vibration caused by the eccentric machining, and a third moving speed of the tool 26 that is moved by a composite command which is a composition of the relative move command and the vibration command.

FIG. 17 is a graph that is related to the second embodiment and illustrates the first moving speed of the tool 26 that is moved relative to the workpiece 35 by the relative move command before and after the command adjustment, the second moving speed of the tool 26 that is moved by the vibration caused by the eccentric machining, and the third moving speed of the tool 26 that is moved by the composite command which is a composition of the relative move command and the vibration command.

Each of the charts of waveforms shown in FIGS. 16 and 17 has a horizontal axis representing time and a vertical axis representing the moving speed of the tool 26 in the X direction. In the example of FIG. 16, the moving speed of the tool 26 is out of the allowable range. In this case, the control device 1 can avoid the moving speed from deviating from the allowable range by adjusting the timing for executing the relative move command to move the tool 26 relative to the workpiece 35.

The determination unit 94 determines whether the composite sum of speed, which is the sum of the first and second moving speeds acquired by the tool speed acquisition unit 93, exceeds the upper limit of the speed. When the composite sum of speed exceeds the upper limit of the speed, the command adjuster 95 adjusts the timing for executing the relative move command to move the tool 26 relative to the workpiece 35 to make the composite sum of speed equal to or less than the upper limit of the speed.

Specifically, when the composite sum of speed exceeds the upper limit of the speed, the command adjuster 95 adjusts the timing for executing the relative move command to move the tool 26 relative to the workpiece 35 so that the timing for executing the relative move command to move the tool 26 relative to the workpiece 35 is delayed by time T. The command adjuster 95 may adjust the phase of the vibration caused by the eccentric machining so that timing for executing the vibration command for the eccentric machining advances by time T.

In place of the process described above, the command adjuster 95 may adjust both of the timing for executing the relative move command to move the tool 26 relative to the workpiece 35 and the phase of the vibration caused by the eccentric machining. Thus, the adjustment makes the composite sum of speed equal to or less than the upper limit of the speed.

The command adjuster 95 may perform the adjustment to minimize the absolute value of the moving speed of the tool as much as possible. This allows the control device 10 to reduce the load on the machine tool 20.

FIG. 18 is a graph that is related to the second embodiment and illustrates the first moving speed of the tool 26 that is moved relative to the workpiece 35 by the relative move command before and after the command adjustment, the second moving speed of the tool 26 that is moved by the vibration caused by the eccentric machining, and the third moving speed of the tool 26 that is moved by the composite command which is a composition of the relative move command and the vibration command.

In the example of FIG. 18, unlike the example of FIG. 17, the timing for executing the relative move command to move the tool 26 relative to the workpiece 35 is not adjusted, but the first moving speed of the tool 26 that is moved relative to the workpiece 35 by the relative move command is adjusted. In the example of FIG. 18, when the composite sum of speed exceeds the upper limit of the speed, the command adjuster 95 adjusts the first moving speed of the tool 26 that is moved relative to the workpiece 35 by the relative move command to make the composite sum of speed equal to the upper limit of the speed. This keeps the composite sum of speed from exceeding the upper limit of the speed.

As another example, when the composite sum of speed exceeds the upper limit of the speed, the command adjuster 95 may adjust the first moving speed to reduce the composite sum of speed to zero, for example. Alternatively, the command adjuster 95 may adjust the first moving speed of the tool 26 that is moved relative to the workpiece 35 by the relative move command and the timing for executing the relative move command to move the tool 26 relative to the workpiece 35. This allows the control device 10 to reduce the load on the machine tool 20.

As described above, the command adjuster 95 may adjust other parameters than the composite speed, such as the acceleration of the vibration caused by the composite command.

Further, as described above, when the parameters of the composite command cannot be obtained in advance, the command adjuster 95 may adjust the parameters of the composite command by adjusting the command based on the feedback from a sensor capable of directly observing the parameters and finishing the adjustment when the parameters reach desired values.

FIG. 19 is a flowchart illustrating a flow of processes performed by the control device 10 of the second embodiment. In Step S11, the vibration command generator 91 generates a vibration command to cause the tool 26 of the machine tool 2 or the workpiece 35 to vibrate.

In Step S12, the relative move command generator 92 generates a relative move command to cause the tool 26 and the workpiece 35 to relatively move.

In Step S13, the tool speed acquisition unit 93 acquires, based on at least the relative move command and the vibration command, a first moving speed of the tool 26 that is moved relative to the workpiece 35 by the relative move command and a second moving speed of the tool 26 that is moved by the vibration caused by the eccentric machining.

In Step S14, the determination unit 94 determines whether a composite sum of speed, which is the sum of the first and second moving speeds acquired by the tool speed acquisition unit 93, exceeds an upper limit of the speed. When the composite sum of speed exceeds the upper limit of the speed (YES is selected), the process proceeds to Step S15. When the composite sum of speed does not exceed the upper limit of the speed (NO is selected), the process ends.

In Step S15, when the composite sum of speed exceeds the upper limit of the speed, the command adjuster 95 adjusts the timing for executing the relative move command to move the tool 26 relative to the workpiece 35 to make the composite sum of speed equal to or less than the upper limit of the speed. When the composite sum of speed exceeds the upper limit of the speed, the command adjuster 95 adjusts the moving speed of the tool 26 that is moved relative to the workpiece 35 by the relative move command.

As described above, the control device 10 of the second embodiment includes the vibration command generator 91 that generates the vibration command to cause the tool of the machine tool 20 or the workpiece to vibrate, the relative move command generator 92 that generates the relative move command to cause the tool and the workpiece to relatively vibrate, and the command adjuster 95 that adjusts at least one of the plurality of parameters of the vibration command and the relative move command based on the vibration command and the relative move command.

Thus, the control device 10 adjusts at least one of the parameters of the vibration command and the relative move command based on the vibration command and the relative move command, appropriately adjusting the composite vibration which is a composition of the vibration of the tool or the workpiece and the relative vibration of the tool and the workpiece. The control device 1 can minimize or maximize factors attributable to the composite vibration (e.g., the amplitude and acceleration of the composite vibration and the vibration and sound made by the whole machine tool 20) as much as possible.

Alternatively, the parameters of the relative move command include timing for executing the relative move command, and the command adjuster 95 may adjust at least one of the parameters based on the vibration command. Thus, the control device 1 can adjust the parameter of the composite vibration to a suitable value.

The parameters of the relative move command include the moving speed of the tool that is moved by the relative move command, and the command adjuster 95 may adjust at least one of the parameters based on the vibration command. Thus, the control device 1 can adjust the parameter of the composite vibration to a suitable value.

The above-described embodiments have been focused on the control device 1 for controlling the machine tool 2, but the present invention is not limited to the embodiments. For example, in another embodiment of the present invention, the control device 1 may be replaced with a computing device 100.

FIG. 20 is a view schematically illustrating a computing device 100 of another embodiment. The computing device 100 is a computer device connected to the control device 1. In the embodiment shown in FIG. 20, the control device 1 controls a machine tool 2 in accordance with a control command outputted from the computing device 100.

As shown in FIG. 20, the computing device 100 includes a vibration command generator 101, a relative vibration command generator 102, a vibration phase adjuster 103, an amplitude calculator 104, a determination unit 105, a related axial vibration command generator 106, and a vibration phase setting unit 107.

The vibration command generator 101, the relative vibration command generator 102, the vibration phase adjuster 103, the amplitude calculator 104, the determination unit 105, the related axial vibration command generator 106, and the vibration phase setting unit 107 correspond to vibration command generator 11, relative vibration command generator 12, vibration phase adjuster 13, amplitude calculator 14, determination unit 15, related axial vibration command generator 16, and vibration phase setting unit 17 of the above-described embodiments. These components achieve the same control as performed in the first embodiment.

Thus, the computing device 100 can appropriately adjust composite vibration, which is a composition of the vibration of the tool or the workpiece and the relative vibration of the tool and the workpiece, in the same manner as the control device 1 of the first embodiment. The computing device 100 may have the same configuration as the control device described in the second embodiment instead of the configuration of the first embodiment. In this case, the computing device 100 achieves the same control as the control described in the second embodiment. Thus, the computing device 100 can appropriately adjust the composite vibration, which is a composition of the vibration of the tool or the workpiece and the relative vibration of the tool and the workpiece, in the same manner as the control device 10 of the second embodiment.

The control device 1 and computing device 100 described in the embodiments of the present invention can be implemented by hardware, software, or a combination of the hardware and the software. A control method achieved by the control device 1 and the computing device 100 can also be implemented by hardware, software, or a combination of the hardware and the software. The expression "implemented by the software" means that a computer reads and executes a program to implement the functions of the control system or the control.

The program can be stored in various types of non-transitory computer readable media and supplied to the computer. The non-transitory computer readable media include various types of tangible storage media. Examples of the non-transitory computer readable media include a magnetic recording medium (e.g., a hard disk drive), a magneto-optical recording medium (e.g., a magneto-optical disk), a compact disc read only memory (CD-ROM), a CD-R, a CD-R/W, and a semiconductor memory (e.g., a mask ROM, a programmable ROM (PROM), an erasable PROM (EPROM), a flash ROM, and a random access memory (RAM)).

In this specification, it has been described as an example the operation of the control device when the vibration command to cause the tool or the workpiece to move back and forth in a single axis direction is combined with another vibration command and a move command. However, the control device may also be applied to, for example, a configuration in which the vibrations in two or more axis directions are made in synchronization to achieve a continuous arcuate motion, as disclosed by Japanese Patent No. 3093933.

The embodiments have been described above as advantageous embodiments of the present invention, but the scope of the present invention is not limited to the embodiments. Various types of modifications can be made without departing from the spirit of the present invention.

EXPLANATION OF REFERENCE NUMERALS

1 Control device
2 Machine tool
11 Vibration command generator
12 Relative vibration command generator
13 Vibration phase adjuster
14 Amplitude calculator
15 Determination unit
16 Related axial vibration command generator
17 Vibration phase setting unit
21 Motor
22 Motor
23 Tool
24 Main shaft
30 Workpiece
100 Computing device

The invention claimed is:

1. A control device for controlling a machine tool, comprising:
　a vibration command generator that generates a vibration command to cause a tool of the machine tool or a workpiece to vibrate;
　a vibration command generator that generates a vibration command to cause the tool and the workpiece to relatively vibrate; and
　a vibration phase adjuster that adjusts a phase of the vibration caused by the vibration command or a phase of the vibration caused by the relative vibration command based on the vibration command and the relative vibration command.

2. The control device according to claim 1, wherein the vibration phase adjuster adjusts at least one of the phase of the vibration caused by the vibration command or the phase of the vibration caused by the relative vibration command so that a parameter of composite vibration, which is a composition of the vibration caused by the vibration command and the vibration caused by the relative vibration command, has a predetermined value.

3. The control device according to claim 2, further comprising: a determination unit that determines whether the parameter is within a predetermined allowable range, wherein when the parameter is out of the allowable range, the vibration phase adjuster adjusts at least one of the phase of the vibration caused by the vibration command or the phase of the vibration caused by the relative vibration command.

4. The control device according to claim 3, further comprising:
　an amplitude calculator that calculates an amplitude of the vibration of the tool or the workpiece based on the vibration command and calculates an amplitude of the relative vibration of the tool and the workpiece based on the relative vibration command, wherein
　the determination unit determines whether a composite sum of amplitude, which is the parameter and is the sum of the amplitude of the vibration of the tool or the workpiece and the amplitude of the relative vibration of the tool and the workpiece, is equal to or less than an upper limit of the amplitude having the allowable range, and
　when the composite sum of amplitude exceeds the upper limit of the amplitude, the vibration phase adjuster adjusts at least one of the phase of the vibration caused by the vibration command or the phase of the vibration caused by the relative vibration command.

5. The control device according to claim 3, further comprising:
　an amplitude calculator that calculates an amplitude of the vibration of the tool or the workpiece based on the vibration command and calculates an amplitude of the relative vibration of the tool and the workpiece based on the relative vibration command, wherein
　the determination unit determines whether a composite sum of amplitude, which is the parameter and is the sum of the amplitude of the vibration of the tool or the workpiece and the amplitude of the relative vibration of the tool and the workpiece, is equal to or greater than a lower limit of the amplitude having the allowable range, and
　when the composite sum of amplitude falls below the lower limit of the amplitude, the vibration phase adjuster adjusts at least one of the phase of the vibration caused by the vibration command or the phase of the vibration caused by the relative vibration command.

6. The control device according to claim 1, further comprising: a vibration phase setting unit that adjusts a phase of vibration with respect to a different axis direction related to the vibration command or the relative vibration command in accordance with the phase of the vibration adjusted by the vibration phase adjuster.

7. The control device according to claim 1, wherein when the vibration caused by the vibration command and the vibration caused by the relative vibration command have different frequencies, the vibration phase adjuster adjusts at least one of the frequency and phase of the vibration caused by the vibration command or the frequency and phase of the vibration caused by the relative vibration command.

8. A computing device for a control device for controlling a machine tool, the computing device comprising:
　a vibration command generator that generates a vibration command to cause a tool of the machine tool or a workpiece to vibrate;

a relative vibration command generator that generates a relative vibration command to cause the tool and the workpiece to relatively vibrate; and a vibration phase adjuster that adjusts a phase of the vibration caused by the vibration command or a phase of the vibration caused by the relative vibration command based on the vibration command and the relative vibration command.

\* \* \* \* \*